Figure 1:
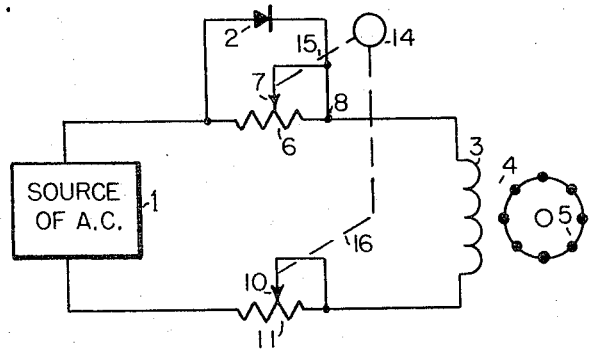

Jan. 24, 1967  H. LEKNOVICH  3,300,699

UNIFIED CONTROL OF INDUCTION MOTOR SPEED

Filed Aug. 14, 1964

*INVENTOR.*
HENRY LEKNOVICH

BY *Harry R. Lubcke*

AGENT

United States Patent Office 3,300,699
Patented Jan. 24, 1967

3,300,699
UNIFIED CONTROL OF INDUCTION MOTOR SPEED
Henry Leknovich, Alhambra, Calif., assignor to Tamar Electronics, Inc., Anaheim, Calif., a corporation of California
Filed Aug. 14, 1964, Ser. No. 389,569
12 Claims. (Cl. 318—212)

This invention relates to an electrical circuit for altering the operating speed of an alternating current motor over a large range.

The typical alternating current motor to which this invention relates is the induction type. Such a motor operates at less than synchronous speed and in a wide range of embodiments employs the known squirrel cage rotor, eliminating slip rings and brushes. Such a motor is useful when operated in or near sensitive electromagnetic wave apparatus, such as receivers. Heretofore it has been impossible to obtain as great a speed variation from such a motor as has been required, at least by simple means, and so the art has been stymied in this matter.

In a broader sense, however, the circuit of this invention is applicable to a wide range of alternating current motors of large and small power ratings, as will be later evident in discussing various examples.

The operating speed of an induction motor depends upon the external load applied, the internal losses of the motor, the frequency of the electrical energy supplied and the number of poles the motor has. This speed can be determined from the following equation:

$$N = \frac{120f(1-S)}{P} \quad (1)$$

in which:

$N$ = operating speed, in revolutions per minute
$f$ = frequency of electrical energy
$P$ = number of poles
$S$ = slip, expressed as a fraction less than one The number of poles is fixed for any motor and the frequency of the electrical energy is also frequently fixed. Thus, the speed control circuit of this invention alters the slip, S. For operation at near synchronous speed S is a small fraction, like 0.03. According to this invention the slip can be made very large, as 0.98, and still the motor rotates uniformly and performs useful work.

Expressed in another manner, any speed reduction from the normal near, but less than synchronous speed, to forty to one for constant torque loads and exceeding eighty to one for loads that increase proportional to speed can be obtained according to this invention. This is obtained by employing only one electrical element and two adjustable electro-mechanical elements, which latter two may be ganged for summary simultaneous adjustment. The prior art has been unable to provide speed reductions in excess of six to one without causing failure of the motor because of overheating of the motor windings. With the circuit of the present invention the motor runs cooler at reduced speed than it does at full speed.

Briefly stated, the invention employs a circuit to provide partial rectification of the alternating current supplied to the motor in combination with means to reduce the voltage impressed upon the motor as the degree of rectification increases. These means may be arranged for ganged operation, so that only one control knob is required for varying the speed of the motor.

The partial rectification is varied by first adjustable electrical impedance means connected across means to rectify the alternating current. Second adjustable electrical means, as a variable resistor, potentiometer or adjustable transformer, reduces the voltage applied to the rest of the circuit. In its simplest form the circuit reduces to two rheostats and a rectifier, which latter may be a semiconductor diode. This is an extremely simple circuit for obtaining such a wide range of speed variation for the motor. Even the more elaborate embodiments of this invention are simple when compared with polyphase alternating current combined with direct current arrangements, which employ the interference-producing commutator or slip ring motors as a necessity, of the prior art.

An object of this invention is to provide simple means for altering the speed of an alternating current motor.

Another object is to alter the speed of rotation of an induction type motor over a very wide range.

Another object is to provide means for operating an induction motor continuously at a small fraction of its normal speed.

Another object is to provide a variable speed alternating current motor system that is essentially free of electrical noise or radio interference.

Other objects will become apparent upon reading the following detailed specification and upon examining the accompanying drawings, in which are set forth by way of illustration and example certain embodiments of this invention.

Figure 2:
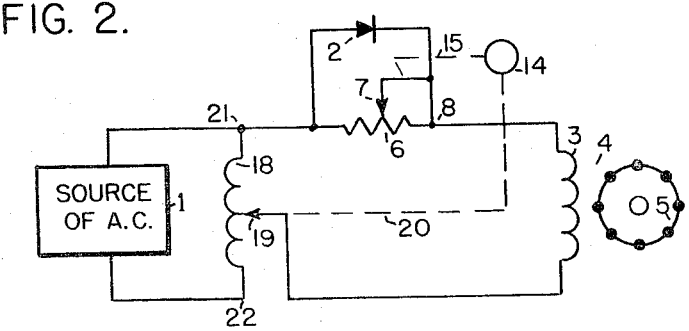
Figure 3:
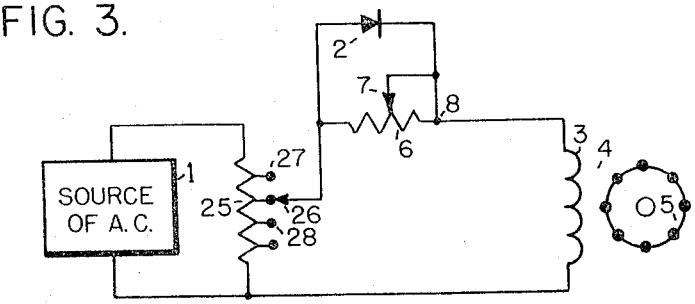
Figure 4:
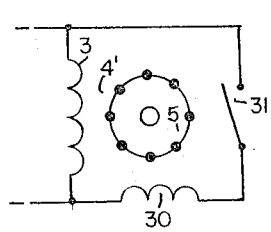

FIG. 1 is a schematic circuit diagram of the speed control, including the motor and a source of electric power, FIG. 2 is an alternate embodiment of the same in which a transformer is employed, FIG. 3 is a further alternate embodiment of the same employing a potentiometer, and FIG. 4 shows the modification of the circuit diagrams for a split-phase motor.

In FIG. 1 numeral 1 indicates a source of alternating current electric power, as, for example, the usual 117 volt 60 cycle alternating current mains. Rectifier 2 is connected to one terminal of source 1 and also to the field winding 3 of electric motor 4. The latter is typically a squirrel-cage type motor, in which there are no electrical connections to the armature 5, hence, no brushes, slip-rings, etc.

Rheostat 6 is connected across rectifier 2. The rheostat may be "potentiometer connected," in that variable contact 7 thereof is connected to one terminal 8. This is a known variant which slightly increases the current-carrying capacity of the variable resistor.

For a motor which is contained within or which operates closely adjacent to an electrical instrument susceptible to interference a squirrel-cage type which draws twelve watts of power at 117 volts 60 cycles/second alternating current is typical. For such a motor the maximum resistance value of rheostate 6 may be 2,000 ohms and a wattage rating of the resistor of two watts is sufficient. For this motor rectifier 2 may be a semi-conductor diode of the ordinary type, such as the 1N2069.

In FIG. 1 the means to alter the voltage impressed upon rectifier 2 and motor field 3 comprises variable resistor 11, which has a maximum resistance value of 175 ohms when used with the twelve watt motor previously considered. The current-carrying capacity of resistor 11 must be the same as the current through field 3 of the motor.

For operation of the motor 4 at full speed the resistance in circuit of both resistors 6 and 11 are minimum, or essentially zero. For reducing speed the resistance in circuit of both resistors is increased. When the resistance of resistor 6 is increased a greater amount of current flows through rectifier 2 and thus half-wave rectified pulses of current flows through field 3 in addition to the usual alternating current. When the resistance of resistor 11 is increased part of the voltage drop in the series circuit including resistor 6, field 3 and resistor 11 occurs across resistor 11. The voltage across field 3 is thus reduced, as is the current through the whole circuit.

For single control operation, a means 14 may be mechanically connected through elements 15 and 16 to the adjustable means 7 of resistor 6 and adjustable means 10 of resistor 11, respectively. Means 14 may be a knob attached to both elements 15 and 16, which latter may be the shafts of known rotary variable resistive devices. Means 14 may also be a small control motor, a stepper motor, or the like, to allow remote control of the speed control circuit when this is desired.

Means 14 is attached to resistor devices 6 and 11 and the connections of the extremities of the resistors to the circuit are made so that actuation of means 14 increases the resistance of both devices together, and vice versa.

In a ganged arrangement, and where it is desired that the variation of the speed of the motor be approximately proportional to the rotation of means 14, the resistance included in the circuit as the resistance value of 6 is increased should also increase at a greater rate; i.e., as a logarithmic function. The variation of resistance with rotation of means 14 may be linear with respect to resistor 11. It will be understood that the most desirable rate of variation for resistor 6 may be determined empirically for each type and design of motor 4.

The low power motor previously described normally employs shading coils for obtaining operation on single phase alternating current power. The circuit of this invention is, however, equally applicable to split-phase motors. Such motors are often applied to loads of the nature of fans or blowers, where the load increases with the speed. A power rating of 65 watts is typical in these applications, and a motor employed with the speed control circuit of this invention had four poles. Other motors of squirrel-cage rotor construction with either shaded poles or split phase magnetic and field construction have been reduced in speed in the ratio of forty to one for constant torque loads and in the ratio of eighty to one, as maximum reductions, for loads in which the torque required increases with speed. A speed reduction of one-hundred to one was obtained with a universal type motor, operable on A.C. or D.C. and having brushes and a commutator. Such a motor is not suitable for operation with sensitive instruments, but may be used if other considerations demand it where this is not a factor. It was considered important to determine that the speed control circuit was of relatively wide application and was not a fortuitous combination for a single motor or a single type of motor.

The split-phase motor 4' shown in FIG. 4 is merely connected in place of motor 4 in any of FIGS. 1–3. Within the split-phase motor there is the additional field winding 30 at a different phase than main field winding 3. A centrifugal switch 31 connects winding 30 in circuit for starting.

In FIG. 2, the rectifier, variable resistor shunting the same, the motor and the source of alternating current power may all be the same as disclosed in FIG. 1. However, the means for altering the voltage supplied by the source and impressed upon the rest of the elements is different. This means takes the form of a transformer, such as autotransformer 18. This has a variable tap 19 that is mechanically adjusted by shaft or equivalent 20. The input terminals 21 and 22 of the transformer are connected to power source 1. Connection 21 is also connected to diode 2 in FIG. 2, and variable tap 19 connects to the end of field winding 3 that is opposite to the connection thereof to rectifier 2.

In the arrangement of FIG. 2 it is seen that the voltage impressed across the series circuit comprised of the diode and the motor field is obtained in essentially the same way as in FIG. 1. The transformer arrangement of FIG. 2, of course, has the advantage of increased electrical efficiency. This is significant with fractional horsepower motors and larger.

For autotransformer 18 the known "Variac" or equivalents thereof may be employed. The two adjusting controls 15 and 20 may be ganged as before, being connected to means 14. This gives a desired ratio of pulsating direct current from the rectifier through field 3 to the voltage across the field for appropriate speed control at each adjustment. The adjusting controls are connected so that as the resistance of variable resistor 6 is increased (giving more D.C.) the voltage from the autotransformer is decreased.

In FIG. 3 a potentiometer 25 is connected across power source 1 in place of the autotransformer of FIG. 2. This has an adjustable arm 26 for decreasing the voltage to the rest of the circuit, which may make connection with any of several contacts 27, 28, etc. at any one time. As before, the voltage is reduced as the proportion of direct current pulses to the alternating current through the field is increased.

It will be understood that a theory of operation is not a necessary part hereof and in this invention the exact mechanism by which the extremely wide variation of speed under useful load is obtained cannot be wholly discerned.

However, it is believed that the speed reduction is brought about by a shift in the position of the magnetic fields at the field poles. The waveform of the current flowing in field winding 3 is different for reduced speed operation as compared to normal operation with alternating current only.

It has been determined that an additional constant magnetic field, which may be adjusted in strength, such as produced by a permanent magnet having adjustable proximity to the field poles of the motor, accomplishes speed reduction of approximately the same order as the introduction of direct current in the field windings. The supply voltage of the alternating current must, of course, be reduced according to the invention as the strength of the magnetic field at the poles is increased.

Since power is the product of torque and speed of rotation, the power output of the motor in mechanical terms is proportionally less for low speeds of operation. Accordingly, less electric power should be supplied to the motor at low speeds of operation, lest the excess be dissipated in heat. This is what is accomplished according to this invention by element 11 in FIG. 1, element 18 in FIG. 2 and element 25 in FIG. 3.

Various other embodiments of this invention may occur to those in the art, in which the voltage across the motor is reduced at the same time that direct current through the field winding, or its equivalent, is increased; with these two variations being made in a correct ratio.

Having thus fully described this invention and the manner in which it is to be practiced, I claim:

1. A speed control circuit for a motor having a field winding comprising;
   (a) electrical means to rectify alternating current,
   (b) first adjustable electrical means having impedance connected across said means to rectify alternating current for altering the amplitude of alternating current that is rectified by said means to rectify alternating current,
   (c) means to connect said first electrical means to one end of said field winding and to a source of alternating current electric power,
   (d) second adjustable means connected to the other end of said field winding and to said source of power to alter the voltage of said source of power that is impressed upon both said means to rectify alternating current and said field winding,
   (e) whereby the speed of said motor is decreased upon said first adjustable means being adjusted to increase said impedance and said second adjustable means being adjusted to reduce said voltage, and
   (f) means to simultaneously mechanically adjust said first adjustable electrical means and said second adjustable electrical means connected to both said means, to simultaneously increase the impedance of said first adjustable electrical means and to decrease the voltage impressed upon said means to rectify alternating current and said field winding.

2. The speed control circuit of claim 1 in which;
(a) said means to rectify is a single semiconductor diode half-wave rectifier.

3. The speed control circuit of claim 1 in which;
(a) said first adjustable electrical means is a rheostat having resistive impedance, and
(b) the change of resistive impedance with linear adjustment of said rheostat is logarithmic.

4. The speed control circuit of claim 1 in which;
(a) said second adjustable means is a rheostat, and
(b) the change of resistance of said second adjustable means with linear adjustment of the rheostat thereof is linear.

5. The speed control circuit of claim 1 in which;
(a) said second adjustable means is a transformer connected across said source of power and having a variable tap output connected to said other end of said field winding.

6. The speed control circuit of claim 5 in which;
(a) the change in voltage with linear adjustment of said variable tap is linear.

7. The speed control circuit of claim 5 in which;
(a) said second adjustable means is an autotransformer.

8. The speed control circuit of claim 1 in which;
(a) said second adjustable means is a potentiometer connected across said source of power, and
(b) having a variable tap output connected to said means to rectify.

9. The speed control circuit of claim 1 in which;
(a) said motor is a shaded pole induction motor.

10. The speed control circuit of claim 1 in which;
(a) said motor is a split phase induction motor.

11. The speed control circuit of claim 1 in which;
(a) said motor has a squirrel-cage rotor.

12. A speed control circuit for an induction motor having a field winding and a squirrel-cage rotor comprising;
(a) a potentiometer-connected variable resistor with means to adjust the resistance thereof, having a logarithmic resistance variation with linear adjustment of the means to adjust the resistance thereof,
(b) a half-wave rectifier element connected across the whole of said potentiometer-connected variable resistor,
(c) a variable resistor with means to adjust the resistance thereof, having a linear resistance variation with linear adjustment of the means to adjust the resistance thereof,
(d) means to gang the two linear adjustment means to simultaneously increase the effective resistance of both said variable resistors for decreasing the speed of said motor, and
(e) means to connect each said variable resistor in a series circuit which includes said potentiometer-connected variable resistor, the field winding of said motor, said variable resistor, and a source of alternating current electric power, in that order.

References Cited by the Examiner
UNITED STATES PATENTS 2,304,604　12/1942　Schweitzer _____ 318—227 X
2,419,431　4/1947　Williams _____ 318—212 X

References Cited by the Applicant
UNITED STATES PATENTS 1,128,005　2/1915　Kimble et al.
1,164,223　12/1915　Scherbius.
1,250,719　12/1917　Turbayne.
1,514,576　11/1924　Thompson.
1,553,406　9/1925　Staege.
1,554,667　9/1925　Thompson.
1,828,272　10/1931　Ashbaugh.
1,828,273　10/1931　Ashbaugh.
1,922,294　8/1933　Honey.
1,966,558　7/1934　O'Hagan.
2,302,304　11/1942　Elberty.
2,386,304　10/1945　Elberty.
2,710,939　6/1955　Moore.
2,871,435　1/1959　Kenyon.

ORIS L. RADER, *Primary Examiner.*

G. Z. RUBINSON, *Assistant Examiner.*